United States Patent
Wang et al.

(10) Patent No.: US 9,699,635 B2
(45) Date of Patent: Jul. 4, 2017

(54) METHODS AND DEVICES FOR FACILITATING EMERGENCY CALLS OVER WIRELESS COMMUNICATION SYSTEMS

(71) Applicant: Telefonaktiebolaget L M Ericsson (PUBL), Stockholm (SE)

(72) Inventors: Chunbo Wang, Shanghai (CN); Amy Li, Shanghai (CN); Lu Wang, Shainghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 29 days.

(21) Appl. No.: 14/435,938

(22) PCT Filed: Mar. 31, 2015

(86) PCT No.: PCT/CN2015/075612
§ 371 (c)(1),
(2) Date: Apr. 15, 2015

(87) PCT Pub. No.: WO2016/154935
PCT Pub. Date: Oct. 6, 2016

(65) Prior Publication Data
US 2016/0295385 A1 Oct. 6, 2016

(51) Int. Cl.
*H04W 4/22* (2009.01)
(52) U.S. Cl.
CPC .................. *H04W 4/22* (2013.01)
(58) Field of Classification Search
CPC ....................................... H04W 4/22
See application file for complete search history.

(56) References Cited

U.S. PATENT DOCUMENTS 7,787,600 B1 * 8/2010 Bari .................. H04L 12/66
370/352
8,041,335 B2 * 10/2011 Khetawat .............. H04W 12/08
455/404.1
(Continued)

FOREIGN PATENT DOCUMENTS

CN 101110758 A 1/2008
CN 104247549 A 12/2014

OTHER PUBLICATIONS

International Search Report and the Written Opinion of the International Searching Authority dated Jan. 7, 2016, in International Application No. PCT/CN2015/075612, 11 pages.

*Primary Examiner* — Nathan Mitchell
(74) *Attorney, Agent, or Firm* — Rothwell, Figg, Ernst & Manbeck, P.C.

(57) ABSTRACT

One embodiment of the present disclosure relates to a method implemented by a first gateway node for processing an emergency call from an untrusted non-3GPP access network. The method comprises: receiving an emergency call request initiated from a terminal device over an untrusted non-3GPP based access network; detecting an event of the emergency call depending upon the emergency network access identifier included in the request message; selecting for the terminal device an emergency access point name that identifies an external network providing an emergency call service; and establishing for the terminal device an emergency call session with a second gateway node interfacing with the external network which is identified by the selected emergency access point name. According to an aspect of the present disclosure, there are provided corresponding methods and devices.

24 Claims, 15 Drawing Sheets

(56) References Cited

U.S. PATENT DOCUMENTS

| | | | |
|---|---|---|---|
| 9,001,835 B2 | 4/2015 | Yang | |
| 2006/0078095 A1* | 4/2006 | Crago | H04M 3/5116 379/45 |
| 2007/0003024 A1* | 1/2007 | Olivier | H04M 11/04 379/45 |
| 2007/0060097 A1* | 3/2007 | Edge | H04L 65/4007 455/404.1 |
| 2007/0143613 A1* | 6/2007 | Sitch | H04W 4/22 713/171 |
| 2008/0311881 A1* | 12/2008 | Taaghol | H04L 67/141 455/404.2 |
| 2010/0303064 A1* | 12/2010 | Bari | H04L 12/66 370/352 |
| 2011/0134897 A1* | 6/2011 | Montemurro | H04M 1/72536 370/338 |
| 2011/0171925 A1* | 7/2011 | Faccin | H04W 76/007 455/404.1 |
| 2012/0094627 A1* | 4/2012 | Suh | H04W 4/22 455/404.1 |
| 2012/0314625 A1 | 12/2012 | Bruce | |
| 2013/0176897 A1* | 7/2013 | Wang | H04W 12/06 370/254 |
| 2015/0024703 A1* | 1/2015 | Lindholm | H04W 36/0022 455/404.1 |

* cited by examiner

METHODS AND DEVICES FOR FACILITATING EMERGENCY CALLS OVER WIRELESS COMMUNICATION SYSTEMS

CROSS REFERENCE TO RELATED APPLICATION(S)

This application is a 35 U.S.C. §371 National Phase Entry Application from PCT/CN2015/075612, filed Mar. 31, 2015, designating the United States, the disclosure of which is incorporated herein in its entirety by reference.

TECHNICAL FIELD

The present disclosure generally relates to wireless communication, particularly to methods and devices for facilitating emergency calls over an untrusted non-3GPP based access network.

BACKGROUND

This section is intended to provide a background to the various embodiments of the invention that are described in this disclosure. The description herein may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Universal Mobile Telecommunications System (UMTS) is the 3rd Generation (3G) mobile communication system standardized by 3rd Generation Partnership Project (3GPP). The 3GPP launched a study item known as "Long Term Evolution (LTE)". The study will investigate means of achieving major leaps in performance in order to improve service provisioning, and to reduce user and operator costs. Out of that and because interworking with other radio access technologies should be possible, the need arose for a new evolved Packet Core Network.

In general, in such mobile communication systems, a terminal device (also called User Equipment (UE)) has access to communication services (including basic services such as in particular providing IP connectivity) via a network comprising a Core Network (CN) accessed by an Access Network (AN).

An example of 3GPP-based mobile communication system is Evolved Packet System (EPS), a description of which can be found in particular in 3GPP standards such as for example 3GPP TS 23.401 and 3GPP TS 23.402 series.

According to the 3GPP standards, EPS includes Evolved Packet Core (EPC) that can be accessed by various access networks, including 3GPP based access networks and non-3GPP based access networks. Examples of 3GPP based access networks include UMTS Terrestrial Radio Access Network (UTRAN), evolved UTRAN (E-UTRAN), GSM EDGE Radio Access Network (GERAN), etc. Examples of non-3GPP based access networks include CDMA2000, Wireless Fidelity (WiFi) Access Network (specified by IEEE, in particular in 802.11 specifications), Worldwide Interoperability for Microwave Access (WiMAX) Access Network (specified by IEEE, in particular in 802.16 specifications).

Two different types of non-3GPP based access networks are involved in the 3GPP standards, i.e. untrusted non-3GPP based access networks and trusted non-3GPP based access network, and normally whether a non-3GPP based access network is trusted or not is left to specific 3GPP operators. During initial attach or handover attach a UE needs to discover the trust relationship (whether it is a trusted or untrusted non-3GPP access network) of the non-3GPP access network in order to know which non-3GPP IP access procedure to initiate.

Some calling solutions enable mobile subscribers to make voice calls (initially) from an untrusted non-3GPP based access environment, such as from residential WiFi. The calls are managed by IP Multimedia Subsystem (IMS) Core, and the solution is sometimes referred to as Voice over Wi-Fi. Those solutions also enable the user to maintain session continuity or IP address persistency when they handover between 3GPP based access (such as for example LTE) to untrusted non-3GPP based access (such as for example WiFi).

The procedures of non-3GPP Packet Date Network (PDN) connection establishment over untrusted non-3GPP access and the handover between 3GPP based accesses and untrusted non-3GPP accesses are defined in 3GPP TS 23.402 and TS 23.401 series.

However, as to the emergency call service, the current 3GPP standards do not support emergency calls over an untrusted non-3GPP accesses (e.g., WiFi) and emergency session continuity for the handover between a 3GPP based access network and an untrusted non-3GPP based access network. Specifically, in the current 3GPP standard: IMS Emergency Session setup over untrusted non-3GPP based access (e.g., WiFi) is not supported; IMS Emergency Session Support for non-3GPP accesses connected to EPC is limited to support of handover of emergency sessions from E-UTRAN access to High Rate Packet Date (HRPD) access (which is normally configured as a trusted access by operators); handover of IMS Emergency Sessions from non-3GPP access to 3GPP based access (e.g., E-UTRAN) is not supported.

SUMMARY

One or more method and apparatus embodiments according to the present disclosure aim to provide one or more solutions for facilitating emergency calls over an untrusted non-3GPP based access network.

According to the first aspect of the present disclosure, there is provided a method implemented by a first gateway node for processing an emergency call. The method comprises receiving an emergency call request initiated from a terminal device over an untrusted non-3GPP based access network. The emergency call request includes an emergency network access identifier constructed by the terminal device. The method further comprises detecting an event of the emergency call depending upon the emergency network access identifier; selecting for the terminal device an emergency access point name that identifies an external network providing an emergency call service; and establishing for the terminal device an emergency call session with a second gateway node interfacing with the external network which is identified with the selected emergency access point name.

According to one or more embodiments of the first aspect of the present disclosure, the method further comprises informing the terminal device of the selected emergency access point name. In this way, the terminal device may store the emergency access point name so as to facilitate potential handover from the untrusted non-3GPP based access network to a 3GPP based access network.

According to the second aspect of the present disclosure, there is provided a method implemented by a terminal device for initiating an emergency call over an untrusted non-3GPP based access network. The method comprises constructing an emergency network access identifier; sending to a first gateway node an emergency call request including the constructed emergency network access identifier; and establishing, via the first gateway node, an emergency call session with a second gateway node interfacing with an external network providing an emergency call service.

According to one or more embodiments of the second aspect of the present disclosure, the method further comprises receiving from the first gateway node an emergency access point name. In this way, the terminal device may then store the emergency access point name that identifies the external network providing the emergency call service, so as to facilitate potential handover from the untrusted non-3GPP based access network to a 3GPP based access network.

According to the third aspect of the present disclosure, there is provided a method implemented by a network node of a 3GPP based access network for facilitating emergency call handover from an untrusted non-3GPP based access network to the 3GPP based access network. The method comprises: receiving a request message sent from a terminal device that are currently performing an emergency call over the untrusted non-3GPP based access network. The request message includes a handover indication and an emergency access point name which identifies an external network used to establish the emergency call. The method further comprises: detecting an event of the emergency call handover based on the handover indication and the emergency access point name; establishing an emergency call session with a second gateway node interfacing with the external network that is identified by the selected emergency access point name; and switching the emergency call of the terminal device from bearer of the untrusted non-3GPP based access network to the bearer of the 3GPP based access network.

According to the fourth aspect of the present disclosure, there is provided a method implemented by a network node of a 3GPP based access network for processing an emergency call. The method comprises: receiving an emergency call request initiated from a terminal device over a 3GPP based access network; selecting for the terminal device an emergency access point name that identifies an external network providing an emergency call service; establishing an emergency call session with a second gateway node interfacing with the external network that is identified by the selected emergency access point name.

According to one or more embodiments of the fourth aspect of the present disclosure, the method further comprises informing the terminal device of the selected emergency access point name. In this way, the terminal device may store the emergency access point name that identifies the external network providing the emergency call service, so as to facilitate potential handover from the untrusted non-3GPP based access network to a 3GPP based access network.

According to the fifth aspect of the present disclosure, there provides a method implemented by a first gateway node for facilitating emergency call handover from a 3GPP based access network to an untrusted 3GPP based access network. The method comprises receiving a request message sent from a terminal device that is currently performing an emergency call over the 3GPP based access network. The request message includes a handover indication and an emergency access point name which identifies an external network used to establish the emergency call. The method further comprises: detecting an event of the emergency call handover based on the handover indication and the emergency network access identifier; and establishing an emergency call session with a second gateway node interfacing with the external network that is identified by the emergency access point name included in the request message.

According to the sixth aspect of the present disclosure, there provides a first gateway node operably for processing an emergency call. The first gateway node comprises: a receiving unit configured to receive an emergency call request initiated from a terminal device over an untrusted non-3GPP based access network. The emergency call request includes an emergency network access identifier constructed by the terminal device. The first gateway node further comprises a detecting unit configured to detect an event of the emergency call depending upon the emergency network access identifier; a selecting unit configured to select for the terminal device an emergency access point name that identifies an external network providing an emergency call service; and a session establishing unit configured to establish for the terminal device an emergency call session with a second gateway node interfacing with the external network which is identified by the selected emergency access point name.

According to the seventh aspect of the present disclosure, there provides a terminal device operably for initiating an emergency call over an untrusted non-3GPP based access network. The terminal device comprises: an identifier constructing unit configured to construct an emergency network access identifier; a transmitting unit configured to send to a first gateway node an emergency call request including the constructed emergency network access identifier; and a session establishing unit configured to establish, via the first gateway node, an emergency call session with a second gateway node interfacing with an external network providing an emergency call service.

According to the eighth aspect of the present disclosure, there provides a network node of a 3GPP based access network operably for facilitating emergency call handover from an untrusted non-3GPP based access network to the 3GPP based access network. The network node comprises: a receiving unit configured to receive a request message sent from a terminal device that is currently performing an emergency call over the untrusted non-3GPP based access network. The request message includes a handover indication and an emergency access point name which identifies an external network used to establish the emergency call. The network node comprises: a detecting unit configured to detect an event of the emergency call handover based on the handover indication and the emergency access point name; a session establishing unit configured to establish an emergency call session with a second gateway node interfacing with the external network that is identified by the selected emergency access point name; and a switching unit configured to switch the emergency call of the terminal device from bearer of the untrusted non-3GPP based access network to the bearer of the 3GPP based access network.

According to the ninth aspect of the present disclosure, there provides a network node of a 3GPP based access network operably for processing an emergency call. The network node comprises: a receiving unit configured to receive an emergency call request initiated from a terminal device over a 3GPP based access network; a selecting unit configured to select for the terminal device an emergency access point name that identifies an external network providing an emergency call service; and a session establishing unit configured to establish an emergency call session with a second gateway node interfacing with the external network that is identified by the selected emergency access point name.

According to the tenth aspect of the present disclosure, there provides a first gateway node operably for facilitating emergency call handover from a 3GPP based access network to an untrusted non-3GPP based access network. The first gateway node comprises: a receiving unit configured to receive a request message sent from a terminal device that is currently performing an emergency call over the 3GPP based access network. The request message includes a handover indication and an emergency access point name which identifies an external network used to establish the emergency call. The first gateway node further comprises: a detecting unit configured to detect an event of the emergency call handover based on the handover indication and the emergency network access identifier; and a session establishing unit configured to establish an emergency call session with a second gateway node interfacing with the external network that is identified by the emergency access point name included in the request message.

According to the eleventh aspect of the present disclosure, there provides a first gateway node operably for processing an emergency call. The first gateway node comprises processing means adapted to cause to receive an emergency call request initiated from a terminal device over an untrusted non-3GPP based access network, wherein the emergency call request includes an emergency network access identifier constructed by the terminal device; cause to detect an event of the emergency call depending upon the emergency network access identifier; cause to select for the terminal device an emergency access point name that identifies an external network providing an emergency call service; cause to establish for the terminal device an emergency call session with a second gateway node interfacing with the external network which is identified by the selected emergency access point name.

According to the twelfth aspect of the present disclosure, there provides a terminal device operably for initiating an emergency call over an untrusted non-3GPP based access network. The terminal device comprises processing means adapted to: cause to construct an emergency network access identifier; cause to send to a first gateway node an emergency call request including the constructed emergency network access identifier; cause to establish, via the first gateway node, an emergency call session with a second gateway node interfacing with an external network providing an emergency call service.

According to the thirteenth aspect of the present disclosure, there provides a network node of a 3GPP based access network for facilitating emergency call handover from an untrusted non-3GPP based access network to the 3GPP based access network. The network node comprises processing means adapted to: cause to receive a request message sent from a terminal device that is currently performing an emergency call over the untrusted non-3GPP based access network, wherein the request message includes a handover indication and an emergency access point name which identifies an external network used to establish the emergency call; cause to detect an event of the emergency call handover based on the handover indication and the emergency access point name; cause to establish an emergency call session with a second gateway node interfacing with the external network that is identified by the selected emergency access point name; cause to switch the emergency call of the terminal device from bearer of the untrusted non-3GPP based access network to the bearer of the 3GPP based access network.

According to the fourteenth aspect of the present disclosure, there provides a network node of a 3GPP based access network operably for processing an emergency call. The network node comprises processing means adapted to: cause to receive an emergency call request initiated from a terminal device over a 3GPP based access network; cause to select for the terminal device an emergency access point name that identifies an external network providing an emergency call service; cause to establish an emergency call session with a second gateway node interfacing with the external network that is identified by the selected emergency access point name.

According to the fifteenth aspect of the present disclosure, there provides a first gateway node operably for facilitating emergency call handover from a 3GPP based access network to an untrusted non-3GPP based access network. The first gateway node comprises processing means adapted to: cause to receive a request message sent from a terminal device that is currently performing an emergency call over the 3GPP based access network, wherein the request message includes a handover indication and an emergency access point name which identifies an external network used to establish the emergency call; cause to detect an event of the emergency call handover based on the handover indication and the emergency network access identifier; cause to establish an emergency call session with a second gateway node interfacing with the external network that is identified by the emergency access point name included in the request message.

According to one or more embodiments of the present disclosure, a user is allowed to make an emergency call even over an untrusted non-3GPP based access network, for example, a WiFi residential environment. In a meanwhile, the continuity of the emergency call session can be maintained by appropriately handing over between the untrusted non-3GPP based access network and a 3GPP based access network.

BRIEF DESCRIPTION OF THE DRAWINGS

Inventive features regarded as the characteristics of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION

Hereinafter, embodiments of the present disclosure will be described with reference to the accompanying drawings. In the following description, many specific details are illustrated so as to understand the present disclosure more comprehensively. However, it is apparent to the skilled in the art that implementation of the present invention may not have these details. Additionally, it should be understood that the present invention is not limited to the particular embodiments as introduced here. On the contrary, any combination of the following features and elements may be considered to implement and practice the present invention, regardless of whether they involve different embodiments. For example, while it is described below in the context of 5G cellular communication system for illustrative purposes, those skilled in the art will recognize that one or more embodiments of the present disclosure can also be applied to various other types of cellular communication systems. Thus, the following aspects, features, embodiments and advantages are only for illustrative purposes, and should not be understood as elements or limitations of the appended claims, unless otherwise explicitly specified in the claims.

Figure 1:
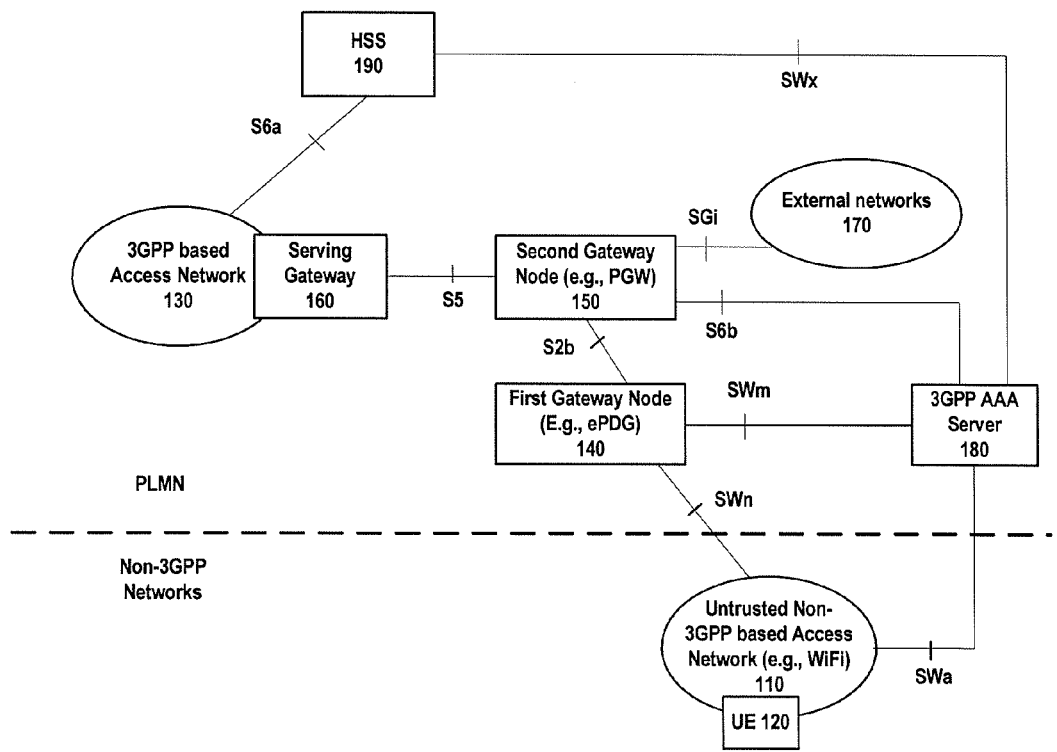
FIG. 1 is a diagram schematically illustrating a network architecture, on which various embodiments of the present disclosure can be practiced.

FIG. 1 is a diagram schematically illustrating a network architecture, on which various embodiments of the present disclosure can be practiced.

As shown in FIG. 1, the system 100 is for example an EPS including an untrusted non-3GPP based network 110 (e.g., a WiFi access network) and a 3GPP based access network 130 (a LTE access network).

UE 120, which is attached to an access point (not shown) of the untrusted non-3GPP access network 110, has an access to external networks 170 (which provide IP services) via a first gateway node 140 (e.g., an evolved Packet Data Gateway (ePDG)) and a second gateway node 150 (e.g., a Packet Data Network Gateway (PDN Gateway, PGW)).

The first gateway node 140 interfaces with the untrusted nono-3GPP based access network 110 enabling routing packet from/to the second gateway node 150 to/from UE 120 in the untrusted non-3GPP based access network 110. The first gateway node 140 is also capable of relaying Authentication, Authorization and Accounting (AAA) messages between the UE 120 and a 3GPP AAA server 180/Home Subscriber Server (HSS) 190 to perform 3GPP AAA procedures for the UE 120 in the untrusted non-3GPP based access network 110. For implementation of the above functionalities, different interfaces may be used by the first gateway node 140, as defined particular in 3GPP TS 23.402 v13.1.0:

S2b It provides the user plane with related control and mobility support between the ePDG and the PGW;

SWn This is the reference point between the untrusted Non-3GPP IP Access and the ePDG. Traffic on this interface for a UE-initiated tunnel has to be forced towards the ePDG;

SWm This reference point is located between 3GPP AAA Server/Proxy and the ePDG and is used for AAA signalling (transport of mobility parameters, tunnel authentication and authorization data).

The second gateway node 150 (e.g., a PGW of the EPS) provides connectivity for UEs (in both the 3GPP based access network 130 and the untrusted non-3GPP based access network 110) to the external packet data networks 170 by being the point of exit and entry of traffic for the UE. The second gateway node 150 is to act as the anchor for mobility between 3GPP and non-3GPP technologies. For implementation of the above functionalities, different interfaces may be used by the second gateway node 150, as defined particular in 3GPP TS 23.402 v13.1.0:

SGi It is the reference point between the PGW and the packet data network (shown as "External networks 170" in FIG. 1). Packet data network may be an operator external public or private packet data network or an intra-operator packet data network, e.g. for provision of IMS services.

S5 It provides user plane tunnelling and tunnel management between the Serving GW (shown as "Serving Gateway 160" in FIG. 1) and PGW. It is used for Serving GW relocation due to UE mobility and in case the Serving GW needs to connect to a non-collocated PDN GW for the required PDN connectivity.

S6b It is the reference point between PDN Gateway and 3GPP AAA server/proxy (shown as "3GPP AAA server 180" in FIG. 1) for mobility related authentication if needed. This reference point may also be used to retrieve and request storage of mobility parameters. This reference point may also be used to retrieve static QoS profile for a UE for non-3GPP access in case dynamic PCC is not supported.

The Serving Gateway (SGW) 160 routes and forwards user data packets, while also acting as the mobility anchor for the user plane during inter-eNB handovers and as the anchor for mobility between LTE and other 3GPP technologies.

Although not shown in FIG. 1, it should be appreciated by the person skilled in the art that the 3GPP based access network 130 comprises different functional network elements, for example, Node Bs (eNB or eNode B), Mobility Management Entities (MME).

The eNode B provides the E-UTRA user plane and control plane protocol terminations towards the UE in the 3GPP based access network 130.

The MME is the key control-node for the 3GPP based access network 130. It is responsible for idle mode UE tracking and paging procedure including retransmissions. It is involved in the bearer activation/deactivation process and is also responsible for choosing the SGW for UE at the initial attach and at time of intra-LTE handover involving Core Network (CN) node relocation. It is responsible for authenticating the user by interacting with the HSS 190. It checks the authorization of the UE to camp on the service provider's Public Land Mobile Network (PLMN) and enforces UE roaming restrictions.

A more detailed description of the network architecture can be found in 3GPP TS 23.402 v13.1.0.

In the present disclosure, terminal devices also known as mobile terminals, wireless terminals and/or User Equipment (UE) are enabled to communicate wirelessly with a network node in a wireless communication system, sometimes also referred to as a cellular radio system. For instance, a terminal device may include but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The communication device may be a portable, pocket-storable, hand-held, computer-comprised, or vehicle-mounted mobile device, enabled to communicate voice and/or data, via a wireless connection.

With reference to FIGS. 2-17, various embodiments of the present disclosure are described in details.

Figure 2:
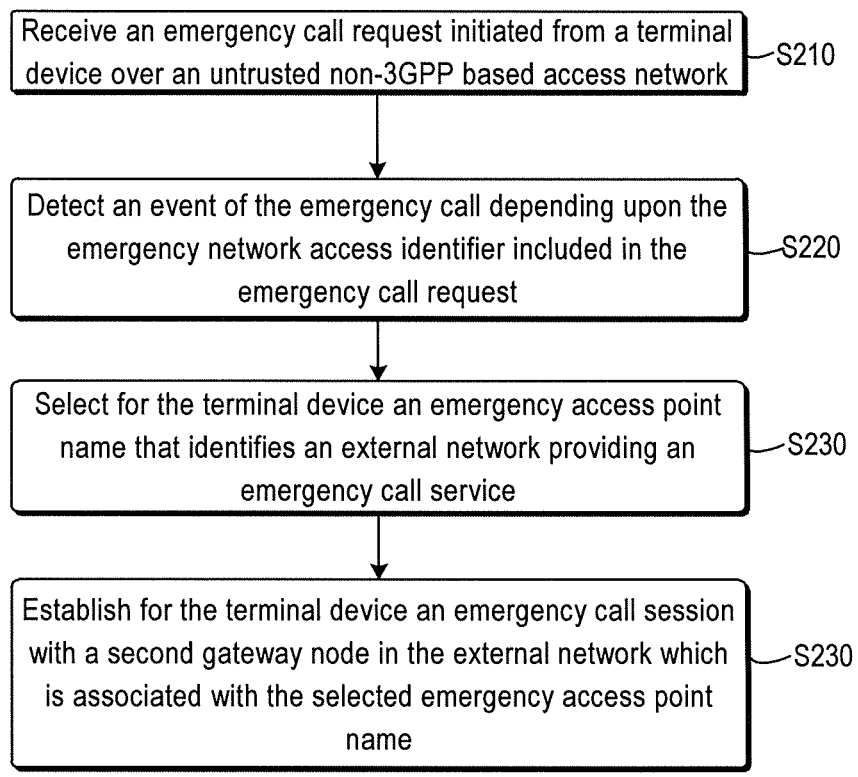
FIG. 2 is a diagram schematically illustrating an exemplary flow chart of a method implemented by a first gateway node according to one or more embodiments of the present disclosure.

FIG. 2 is a diagram schematically illustrating an exemplary flow chart of a method 200 implemented by a first gateway node for processing an emergency call according to one or more embodiments of the present disclosure.

As shown in FIG. 2, the method 200 begins at step S210. In step S210, the first gateway node (e.g., the first gateway node 140) receives an emergency call request initiated from a terminal device (e.g., the UE 120) over an untrusted non-3GPP based access network (e.g., the untrusted non-3GPP based access network 110). In order to indicate the emergency call, the emergency call request includes an emergency network access identifier constructed by the terminal device. Depending upon the emergency network access identifier (NAI) in the call request, the first gateway node detects, in step S220, an event of the emergency call. In step S230, an emergency access point name (APN) is selected by the first gateway node, which identifies a particular external packet data network (one of the external networks 170) that provides the emergency call service requested by the terminal device. The first gateway node then establishes, in step S240, for the terminal device an emergency call session with a second gateway node (e.g., the second gateway node 150) interfacing with the external network which is identified by the selected emergency access point name.

In one or more embodiments of the present disclosure, the method 200 may further comprises the following step (not shown in FIG. 1): the first gateway node may inform the terminal device of the selected emergency access point name. The terminal device may locally store the selected access point name associated with the external network providing the emergency call service, thereby facilitating potential handover procedure from the untrusted non-3GPP based access network to a 3GPP based access network, for example, due to its mobility.

According to one or more embodiments of the present disclosure, during the establishment of an emergency call session for the terminal device, the first gateway node may send to the second gateway node a create session request including the selected emergency access point name, thereby enabling the second network node to identify the emergency call session. Since the terminal device is communicatively interfacing with the untrusted non-3GPP based environment, the first gateway node may also need to perform authentication procedure for the terminal device based on an equipment identity of the terminal device.

Figure 3:
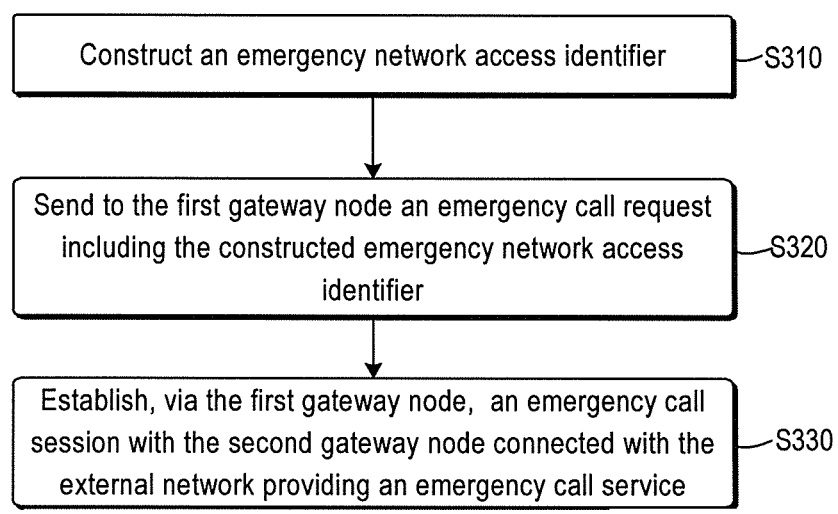
FIG. 3 is a diagram schematically illustrating an exemplary flow chart of a method implemented by a terminal device according to one or more embodiments of the present disclosure.

FIG. 3 is a diagram schematically illustrating an exemplary flow chart of a method 300 implemented by a terminal device for processing an emergency call according to one or more embodiments of the present disclosure.

As shown in FIG. 3, when initiating an emergency call over an untrusted non-3GPP based access network (e.g., the untrusted non-3GPP based access network 110), a terminal device (e.g., the UE 120) constructs, in step S310, an emergency network access identifier for example in response to a user dialing an emergency number. The emergency network access identifier may include a predefined indicator of the emergency call, for example, a character string "SOS". In step S320, the terminal device sends to a first gateway node (e.g., the first gateway node 140) an emergency call request including the constructed emergency network access identifier. An emergency call session with a second gateway node (e.g., the second gateway node 150) is established via the first gateway node in step S330. The second gateway node interfaces with an external network that provides the requested emergency call service.

According to one or more embodiments of the present disclosure, the terminal device may receive from the first gateway node an emergency access point name and store it locally, thereby facilitating potential handover from the untrusted non-3GPP based access network to a 3GPP based access network.

Figure 4:
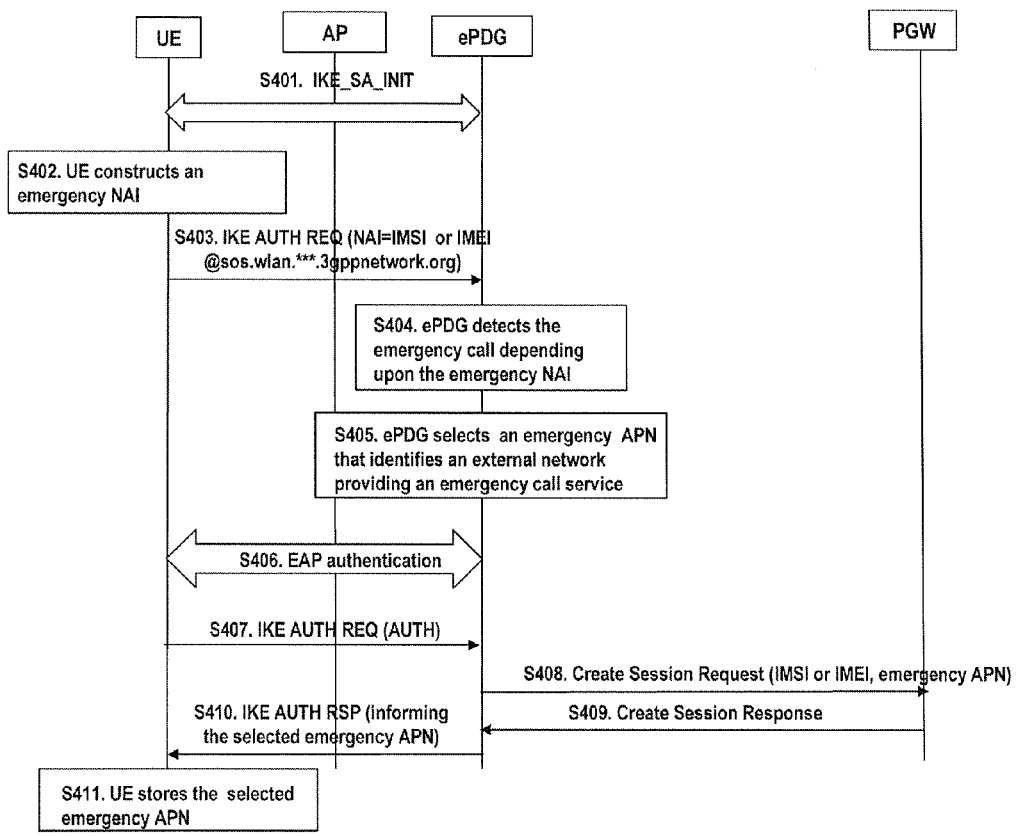
FIG. 4 is an example signaling diagram illustrating an embodiment where an emergency call is initiated over an untrusted non-3GPP based access network.

FIG. 4 is an example signaling diagram illustrating an embodiment where an emergency call is initiated over an untrusted non-3GPP based access network.

As shown in FIG. 4, the UE communicates wirelessly with an access point (AP) of the untrusted non-3GPP based access network (for example, a WiFi network) and accesses to the external networks (e.g., public Internet, Intranet, operator's IMS networks). In the example of FIG. 4, the first gateway node may be an ePDG and the second gateway node may be a PGW.

In step S401, the UE and the ePDG may exchange the first pair of IKE_SA_INIT messages, in which the ePDG and the UE negotiate cryptographic algorithms, exchange nonces and perform a Diffie-Hellman exchange, as specified in 3GPP TS 33.402 V12.5.0.

In step S402, the UE constructs an emergency network access identifier. The emergency network access identifier includes a predetermined indicator of the emergency call and may be compliant to the definition of 3GPP TS 23.003 series.

In step S403, the UE may send a request message IKE AUTH_REQ for the emergency call to the ePDG. The emergency network access identifier constructed by the UE is included in the IKE AUTH_REQ message. More detailed description of IKE AUTH_REQ is provided in Chapter 6.5 of 3GPP TS 33.402 series.

In some implementations, the UE may also include an emergency access point name in the IKE AUTH_REQ, if it has been already configured by the network.

In step S404, the ePDG detects depending upon the emergency network access identifier that the current request is directed to an emergency call. In some implementations, the ePDG may not treat the request as an emergency call request, if the ePDG only receives an emergency access point name but without the emergency network access identifier from the UE.

In step S405, the ePDG may select an appropriate emergency access point name for the UE, for example, by load balancing mechanism. The emergency access point name identifies an external network which will provide the emergency call service for the UE.

In step S406, the ePDG may perform the local Extensible Authentication Protocol (EAP) authentication or the remote EAP authentication with an AAA server (not shown) based on UE Identity (e.g., International Mobile Equipment Identity (IMEI) or International Mobile Subscriber Identification Number (IMSI)) and configuration information. If the UE identity is based on IMEI, then only local EAP authentication needs to be performed.

In step S407, the UE may send the AUTH parameter to the ePDG.

In steps S408 and S409, the ePDG establishes for the UE an emergency call session with the PGW that interfaces with the external network identified by the selected emergency access point name. Specifically, the ePDG may send (S408) a Create Session Request including the UE's IMSI or IMEI, the emergency access point name to the PGW. Upon receipt of the Create Session Request, the PGW may detect the emergency call request based on the emergency APN included in the Request, then handle accordingly and return (S409) a Create Session Response.

In step S410, the ePDG may send the selected emergency access point name and other parameters received from the PGW (e.g., UE IP address) to the UE.

In step S411, the UE may locally store the selected emergency access point name, so as to facilitate potential handover from the untrusted non-3GPP based access network to a 3GPP based access network.

Figure 5:
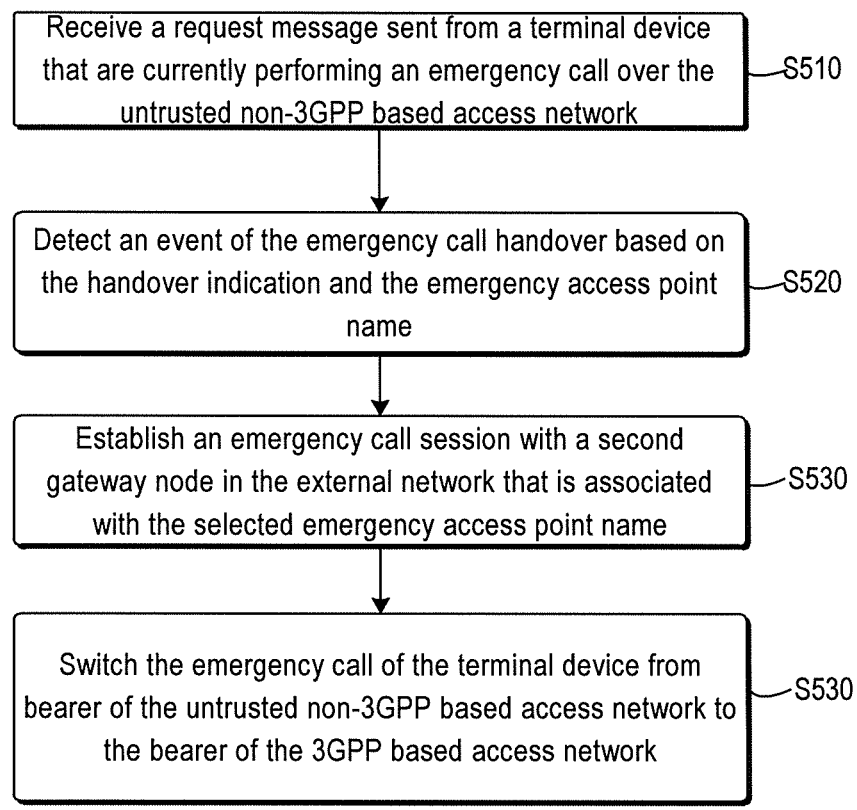
FIG. 5 is a diagram schematically illustrating an exemplary flowchart of a method implemented by a network node of a 3GPP based access network according to one or more embodiments of the present disclosure.

FIG. 5 is a diagram schematically illustrating an exemplary flow chart of a method 500 implemented by a network node of a 3GPP based access network according to one or more embodiments of the present disclosure.

As shown in FIG. 5, the method 500 begins at step S510, where the network node (e.g., MME) of the 3GPP based access network (e.g., the 3GPP based access network 130) receives a request message (e.g., a packet data network connectivity request message or an attach request message) sent from a terminal device (e.g., the UE 120) that is currently performing an emergency call over the untrusted non-3GPP based access network (e.g., the untrusted non-3GPP based access network 110). The request message includes a handover indication and an emergency access point name which identifies an external network (e.g., one of the external networks 170) used to establish the emergency call. The network node detects in step S520 an event of the emergency call handover based on the handover indication and the emergency access point name and then establishes in step S530 an emergency call session with a second gateway node (e.g., the second gateway node 150) interfacing with the external network that is identified by the selected emergency access point name. After the establishment of the emergency session with the second gateway node, the network node switches in step S540 the emergency call of the terminal device from the bearer of the untrusted non-3GPP based access network to the bearer of the 3GPP based access network.

According to one or more embodiments, during the establishment of the emergency call session with the second gateway node, the network node may send to the second gateway node a create session request including the emergency access point name, thereby enabling the second gateway node to identify the emergency call session.

Figure 6:
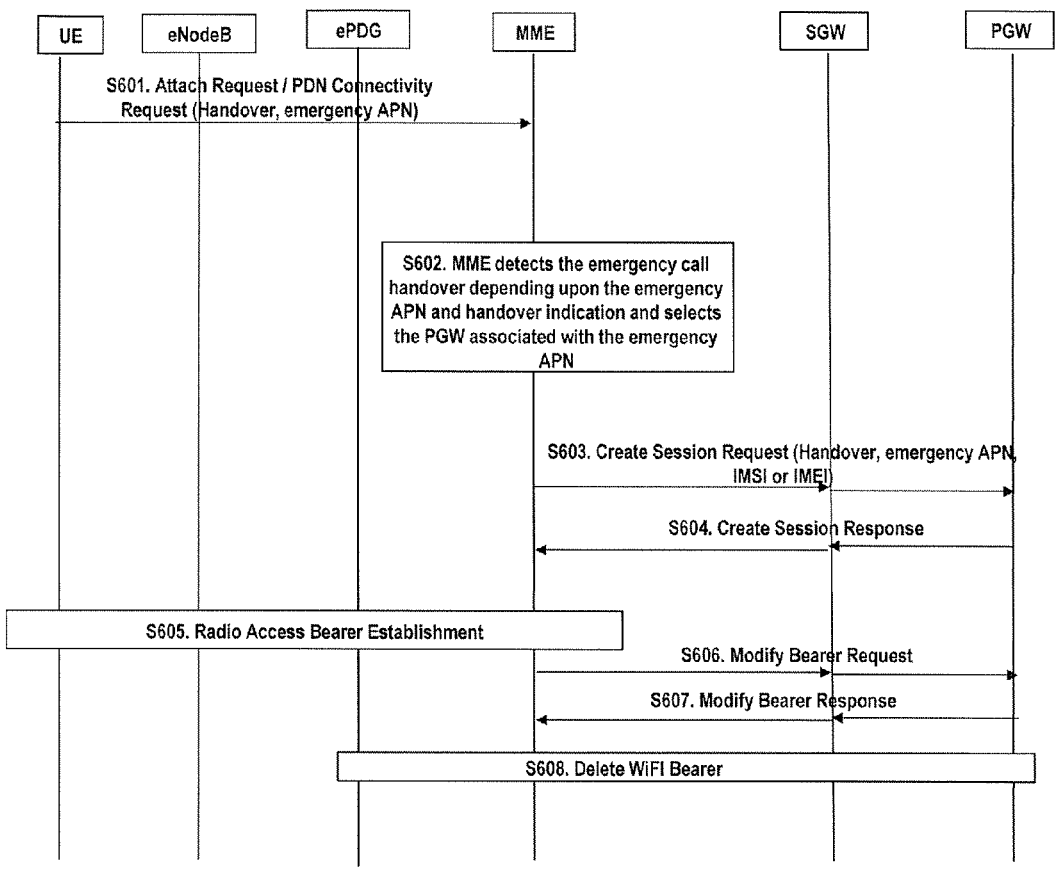
FIG. 6 is an example signaling diagram illustrating an embodiment where a handover of an emergency call is performed from an untrusted non-3GPP based access network to a 3GPP based access network.

FIG. 6 is an example signaling diagram illustrating an embodiment where a handover of an emergency call is performed from an untrusted non-3GPP based access network to a 3GPP based access network.

As shown in FIG. 6, the UE communicates wirelessly with an eNodeB of the 3GPP based access network and accesses to the external networks (e.g., public Internet, Intranet, operator's IMS networks). In the example of FIG. 6, the network node of the 3GPP based access network mainly handling the emergency call handover procedure may be a MME; the first gateway node may be an ePDG and the second gateway node may be a PGW.

In step S601, the UE may discover the 3GPP based access (e.g., E-UTRAN access) and determine to transfer its emergency session from the currently used the untrusted non-3GPP based access network (e.g., WiFi access) to the 3GPP based access network. The UE sends an Attach Request message or PDN Connectivity Request message to the MME with Request Type indicating "Handover". The UE also includes the related emergency access point name in the request message, which was received from the ePDG in step S410 in FIG. 4. More detailed description of the message routed from the UE to the MME may be provided for example in 3GPP TS 23.401 series.

In one or more embodiments of the present disclosure, if the UE is connected to both the 3GPP based access network and the untrusted non-3GPP based access network before the emergency handover is triggered, the UE may set the "Request Type" as "Handover" and include the relevant emergency access point name in a PDN Connectivity Request message. If the UE is only connected to the untrusted non-3GPP based access network before the emergency call handover is triggered, the UE may set the "Attach Type" as "Emergency", the "Request Type" to "Handover" and include the relevant emergency access point name in an Attach Request message.

In step S602, the MME detects that this is an emergency call handover from the untrusted non-3GPP based access network depending upon the "emergency access point name" and the request type "Handover", and then selects the PGW associated with the emergency access point name included in the request message.

According to one or more implementations of the present disclosure, to ensure that the same right PGW can be selected in both 3GPP and untrusted non-3GPP based access networks, the MME configuration may preferably be consistent with the ePDG side, which means that one PGW is associated with one emergency access point name. Multiple emergency access point names may be configured to achieve load balancing among multiple PGWs and the PGW high availability.

In steps S603 and S604, the MME establishes an emergency call session with the PGW that is connected with the external network identified by the selected emergency access point name. Specifically, in step S603, the MME sends a Create Session Request message including the PGW address, the handover indication and the emergency access point name to a corresponding Serving gateway (SGW), which then forwards the Create Session Request towards the selected PGW. The PGW may detect the emergency call handover from the untrusted non-3GPP based access network depending upon the "Handover Indication" and the "emergency access point name" included in the Create Session Request message, then return (S604) a Create Session Response with the IP address of the UE. The SGW may forward the Create Session Response message to the MME. This message may also serve as an indication to the MME that the S5 bearer setup has been successful. The messaging among the MME, SGW and PGW for creating a session may be complaint with 3GPP TS 23.401 series.

From step S605 to step S608, the MME switches the emergency call of the UE from bearer of the untrusted non-3GPP based access network to the bearer of the 3GPP based access network. Specifically, in step S605, Radio and Access bearers are established in the 3GPP based access network, as specified in 3GPP TS 23.401 series. The MME may send in step S606 a Modify Bearer Request message to the SGW, which includes eNodeB address, eNodeB TEID, and the Handover Indication. The SGW forwards the Modify Bearer Request message to the PGW. The PGW may switch the data path to the SGW, and then in step S607, return a Modify Bearer Response. The SGW may forward the Modify Bearer Response message to the MME. In step S608, resource allocation deactivation procedure in the untrusted non-3GPP based access network may be initiated to delete the untrusted non-3GPP bearer.

Figure 7:
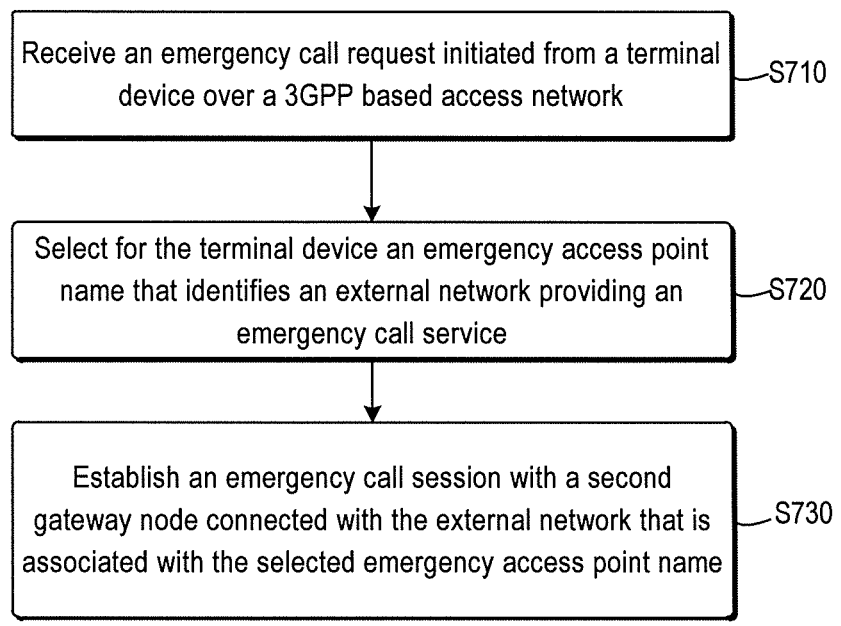
FIG. 7 is a diagram schematically illustrating an exemplary flowchart of a method implemented by a network node of a 3GPP based access network according to one or more embodiments of the present disclosure.

FIG. 7 is a diagram schematically illustrating an exemplary flow chart of a method 700 implemented by a network node of a 3GPP based access network according to one or more embodiments of the present disclosure.

As shown in FIG. 7, the method 700 begins at step S710, where the network node (e.g., a MME) receives an emergency call request initiated from a terminal device (e.g., UE in the 3GPP based access network 130) over a 3GPP based access network (e.g., the 3GPP based access network 130). In step S720, the network node selects for the terminal device an emergency access point name that identifies an external network (e.g., one of the external networks 170) providing an emergency call service. The network node establishes, in step S730, an emergency call session with a second gateway node (e.g., the second gateway 150) interfacing with the external network that is identified by the selected emergency access point name.

According to one or more embodiments of the present disclosure, the network node may inform the terminal device of the selected emergency access point name, thereby facilitating potential handover from the 3GPP based access network to an untrusted non-3GPP based access network (e.g., the untrusted non-3GPP based access network 110).

Figure 8:
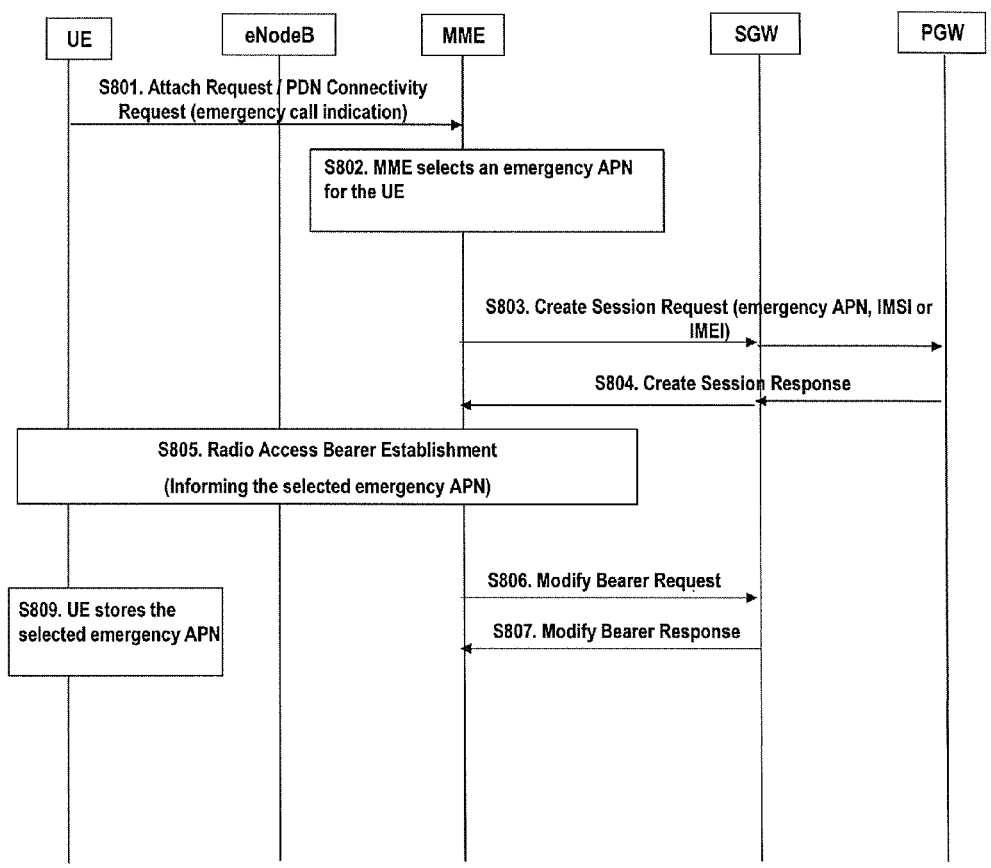
FIG. 8 is an example signaling diagram illustrating an embodiment where an emergency call is initiated over a 3GPP based access network.

FIG. 8 is an example signaling diagram illustrating an embodiment where an emergency call is initiated over a 3GPP based access network.

As shown in FIG. 8, the UE may communicate wirelessly with an eNodeB of the 3GPP based access network and access to the external networks (e.g., public Internet, Intranet, operator's IMS networks). In the example of FIG. 8, the network node of the 3GPP based access network operably processing an emergency call may be a MME; the first gateway node may be an ePDG and the second gateway node may be a PGW.

In step S801, the UE initiates the Attach procedure for an emergency call by the transmission, to the eNodeB, of an Attach Request message with the "Attach Type" as "Emergency". In some embodiments, an emergency access point name may also be included in a PDN connectivity Request message and sent to the MME.

In step S802, The MME may check if the user is allowed to perform handover to non-3GPP accesses, then for such an emergency call, an emergency access point name is selected which is associated with a PGW.

In steps S803 and S804, the MME establishes an emergency call session with the PGW connected with the external network that is identified by the selected emergency access point name. Specifically, the MME sends (S803) to a corresponding SGW a Create Session Request message including the emergency access point name, IMSI or IMEI of the UE, and the PGW address. The SGW may forward the Create Session Request message to the PGW. The PGW may detect the emergency call request depending upon the emergency access point name, handle accordingly, and return (S804) a Create Session Response message with the IP address of the UE. This message may also serve as an indication to the MME that the S5 bearer setup has been successful. The messaging among the MME, SGW and PGW for creating a session may be complaint with the description of 3GPP TS 23.401 series.

In step S805, radio and access bearers are established in the 3GPP based access network, for example, as specified in TS 23.401. According to one or more embodiments of the present disclosure, the selected emergency access point name may be included in Activate Default EPS bearer Request message to inform the UE.

In step S806, the MME may send a Modify Bearer Request message including eNodeB address, eNodeB TEID to the SGW. The SGW acknowledges by sending, in step S807, Modify Bearer Response message including EPS Bearer Identity to the MME.

In step S809, the UE may store the related emergency access point name received in step 805 for potential use in following emergency handover to the untrusted non-3GPP based access network.

Figure 9:
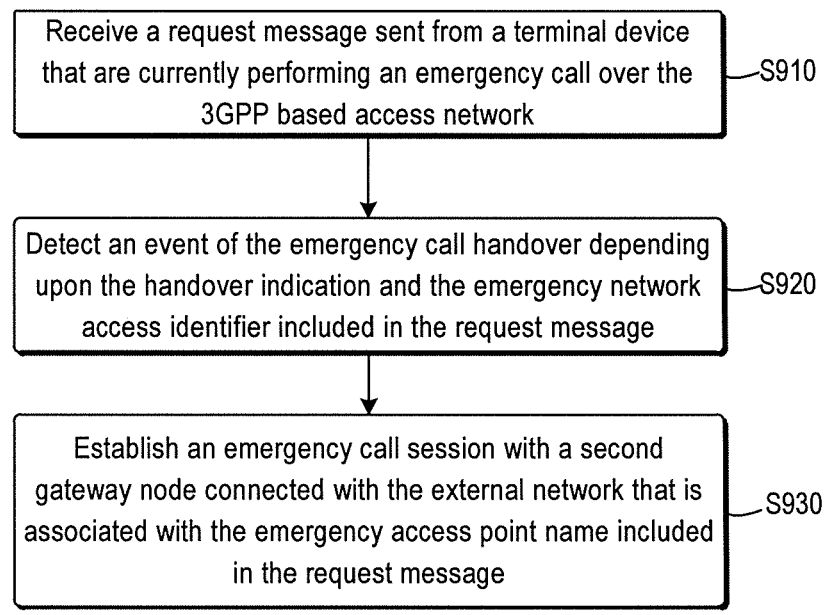
FIG. 9 is a diagram schematically illustrating an exemplary flow chart of a method implemented by a first gateway node according to one or more embodiments of the present disclosure.

FIG. 9 is a diagram schematically illustrating an exemplary flow chart of a method 900 implemented by a first gateway node according to one or more embodiments of the present disclosure.

As shown in FIG. 9, the method 900 begins at step S910 where the first gateway node (e.g., the first gateway node 110) receives a request message sent from a terminal device (e.g., the UE 120) that is currently performing an emergency call over the 3GPP based access network (130). The request message includes a handover indication and an emergency access point name which identifies an external network (one of the external networks 170) used to establish the emergency call. In some implementation, the request message may further include an emergency network access identifier constructed by the terminal device. The first gateway node detects, in step S920, an event of the emergency call handover based on the handover indication and the emergency network access identifier and then establishes, in step S930, an emergency call session with a second gateway node (e.g., the second gateway node 150) interfacing with the external network that is identified by the emergency access point name included in the request message.

According to one or more embodiments of the present disclosure, during the establishment of the emergency call session, the first gateway node may send to the second gateway node a create session request including the handover indication and the emergency access point name, thereby enabling the second gateway node to identify the emergency call session and perform the emergency call handover. The first gateway node may also need to perform authentication procedure for the terminal device based on an equipment identity of the terminal device.

Figure 10:
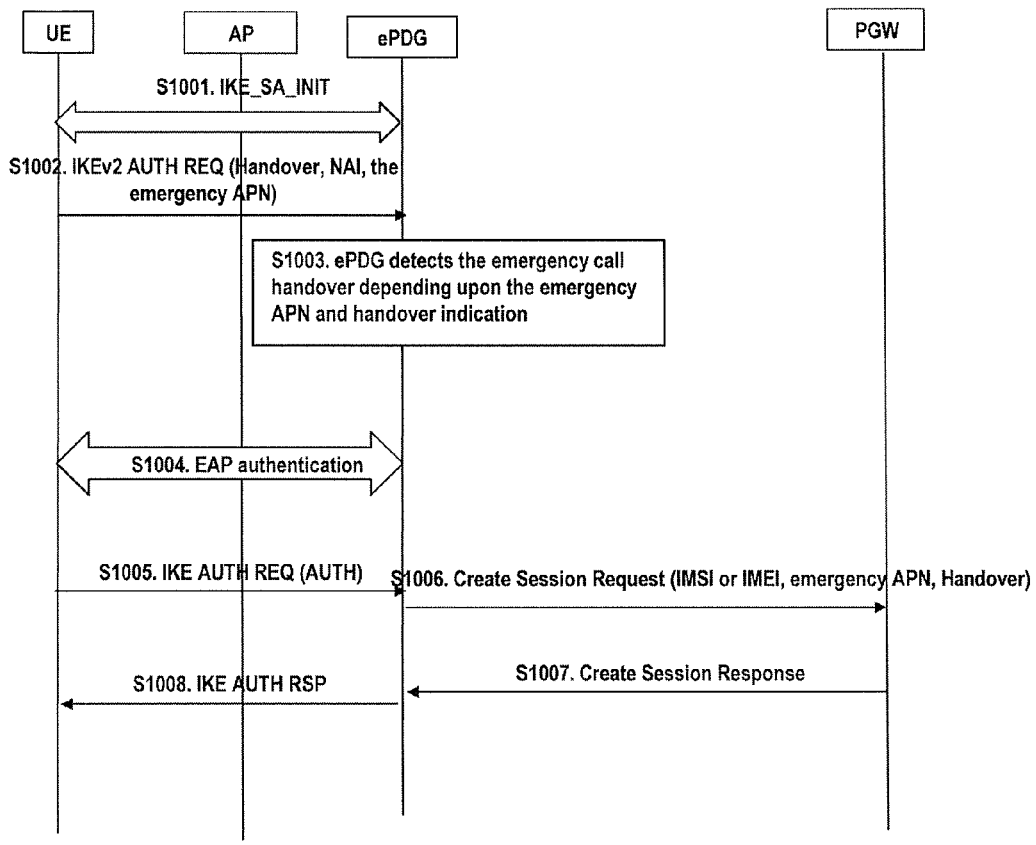
FIG. 10 is an example signaling diagram illustrating an embodiment where a handover of an emergency call is performed from a 3GPP based access network to an untrusted non-3GPP based access network.

FIG. 10 is an example signaling diagram illustrating an embodiment where a handover of an emergency call is performed from a 3GPP based access network to an untrusted non-3GPP based access network.

As shown in FIG. 10, the UE communicates wirelessly with an eNodeB of the 3GPP based access network and accesses to the external networks (e.g., public Internet, Intranet, operator's IMS networks) over the 3GPP based access network (for example, a LTE network). In the example of FIG. 10, the first gateway node may be an ePDG and the second gateway node may be a PGW.

In step S1001, the UE may discover the untrusted non-3GPP based access network (e.g., a WiFi network) and determine to handover its emergency call session from the currently used 3GPP based access network to the untrusted non-3GPP based access network. The UE and the ePDG may exchange the first pair of IKE_SA_INIT messages, in which the ePDG and the UE negotiate cryptographic algorithms, exchange nonces and perform a Diffie-Hellman exchange, for example, as specified in 3GPP TS 33.402 V12.5.0.

In step S1002, the UE may send a request message IKE AUTH_REQ for the handover of the emergency call to the ePDG. The emergency call handover request includes a Handover Indication and the emergency access point name the UE received, for example, at step S805 of FIG. 8. In some implementations, according to the current standard, the UE may indicate "Handover" by including its preserved IP address in the IKE AUTH_REQ message. Alternatively or additionally, the emergency call handover request may further include an emergency network access identifier, which may include a predetermined indicator of the emergency call and may be compliant with the definition of 3GPP TS 23.003 series.

In step S1003, the ePDG detects the emergency call handover request depending upon the emergency network access identifier and the handover indication. The ePDG selects the corresponding PGW based on the emergency access point name included in the IKE AUTH_REQ message. The ePDG emergency APN configuration must be consistent with the ones in MME to ensure the same PGW selected in the emergency handover between 3GPP and non-3GPP.

In step 1004, the ePDG may perform the local EAP authentication or the remote EAP authentication with an AAA server (not shown in FIG. 10) based on UE Identity (e.g., International Mobile Equipment Identity (IMEI) or International Mobile Subscriber Identification Number (IMSI)) and configuration. For IMEI case, only local EAP authentication needs to be performed.

In step S1005, the UE may send the AUTH parameter to the ePDG.

In steps S1006 and S1007, the ePDG establishes for the UE an emergency call session with the PGW that interfaces with the external network identified by the emergency access point name included in the IKE AUTH_REQ message. Specifically, the ePDG may send (S1006) a Create Session Request including the UE's IMSI or IMEI, the emergency access point name and the handover indication to the PGW. Upon receipt of the Create Session Request, the PGW may detect the emergency call handover request from 3GPP based on the emergency access point name and the handover indication, then handles accordingly and return (S1007) a Create Session Response.

In step S1008, the ePDG may send the parameters received from PGW (e.g., UE IP address) to the UE in an IKE AUTH_RSP message.

Figure 11:
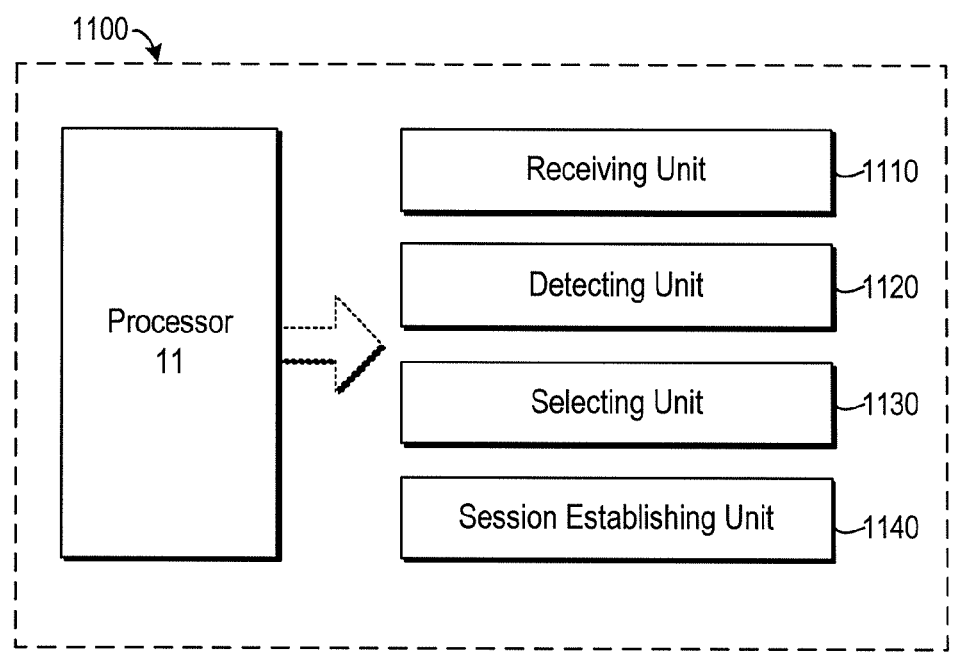
FIG. 11 is a schematic block diagram depicting a first gateway node operably for processing an emergency call according to an embodiment of the present disclosure.

FIG. 11 is a schematic block diagram depicting a first gateway node 1100 operably for processing an emergency call according to an embodiment of the present disclosure.

As shown in FIG. 11, the first gateway node 1100 is configured to process an emergency call over an untrusted non-3GPP based access network. The first gateway 1100 comprises a receiving unit 1110, a detecting unit 1120, a selecting unit 1130 and a session establishing unit 1140. The first gateway node 1100 may comprise multiple suitable network communications interfaces for communications with corresponding network elements, as described with reference to FIG. 1.

The first gateway node 1100 comprises a processor 11, which may include one or more microprocessor or microcontrollers, as well as other digital hardware, which may include digital signal processors (DSPs), special-purpose digital logic, and the like. The processor 11 may be configured to execute program code stored in memory (not shown in FIG. 11), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 11 may be used to cause the receiving unit 1110, the detecting unit 1120, the selecting unit 1130 and the session establishing unit 1140 to perform corresponding functions according one or more embodiments of the present disclosure.

The receiving unit 1110 is configured to receive an emergency call request initiated from a terminal device over an untrusted non-3GPP based access network. The emergency call request includes an emergency network access identifier constructed by the terminal device. The detecting unit 1120 is configured to detect an event of the emergency call depending upon the emergency network access identifier. The selecting unit 1130 is configured to select for the terminal device an emergency access point name that identifies an external network providing an emergency call service. The session establishing unit 1140 is configured to establish for the terminal device an emergency call session with a second gateway node interfacing with the external network which is identified by the emergency access point name selected by the selecting unit 1130.

According to one or more embodiments of the present disclosure, the first gateway node 1100 may further comprise a transmitting unit (not shown in FIG. 11) configured to inform the terminal device of the selected emergency access point name for following potential use of handover from the untrusted non-3GPP based access network to a 3GPP based access network.

According to one or more embodiments of the present disclosure, the session establishing unit 1140 may be further configured to send to the second gateway node a create session request including the selected emergency access point name, thereby enabling the second network node to identify the emergency call session. The session establishing unit 1140 may be further configured to authenticate the terminal device based on an equipment identity of the terminal device.

Figure 12:
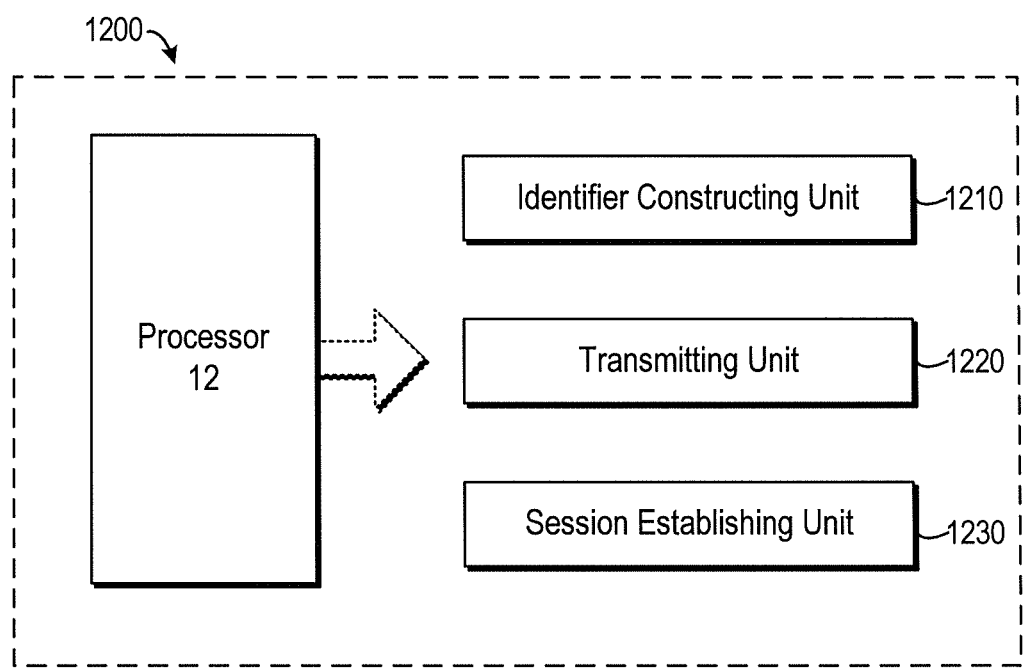
FIG. 12 is a schematic block diagram depicting a terminal device operably for processing an emergency call according to an embodiment of the present disclosure.

FIG. 12 is a schematic block diagram depicting a terminal device 1200 operably for processing an emergency call according to an embodiment of the present disclosure.

As shown in FIG. 12, the terminal device 1200 is configured to initiate an emergency call over an untrusted non-3GPP based access network. The terminal device 1200 comprises: an identifier constructing unit 1210, a transmitting unit 1220, a session establishing unit 1230. The terminal device 1200 may also comprise multiple suitable radio frequency transceivers (not shown in FIG. 12) that may be selectively coupled with one or more antenna(s) (not shown in FIG. 12) which are used to transmit signals to, and receive signals from, other radio nodes such as an eNodeB or a WiFi AP.

The terminal device 1200 comprises a processor 12, which may include one or more microprocessor or microcontrollers, as well as other digital hardware, which may include digital signal processors (DSPs), special-purpose digital logic, and the like. The processor 12 may be configured to execute program code stored in memory (not shown in FIG. 12), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 12 may be used to cause the identifier unit 1210, the transmitting unit 1220, the session establishing unit 1230 to perform corresponding functions according one or more embodiments of the present disclosure.

The identifier constructing unit 1210 is configured to construct an emergency network access identifier. According to one or more embodiments of the present disclosure, the emergency network access identifier may include a predetermined indicator of the emergency call. The transmitting unit 1220 is configured to send to a first gateway node an emergency call request including the constructed emergency network access identifier. The session establishing unit 1230 is configured to establish, via the first gateway node, an emergency call session with a second gateway node interfacing with an external network providing an emergency call service.

According to one or more embodiments of the present disclosure, the terminal device 1200 may further comprise a receiving unit (not shown in FIG. 12) configured to receive from the first gateway node an emergency access point name, thereby facilitating potential handover from the untrusted non-3GPP based access network to a 3GPP based access network.

Figure 13:
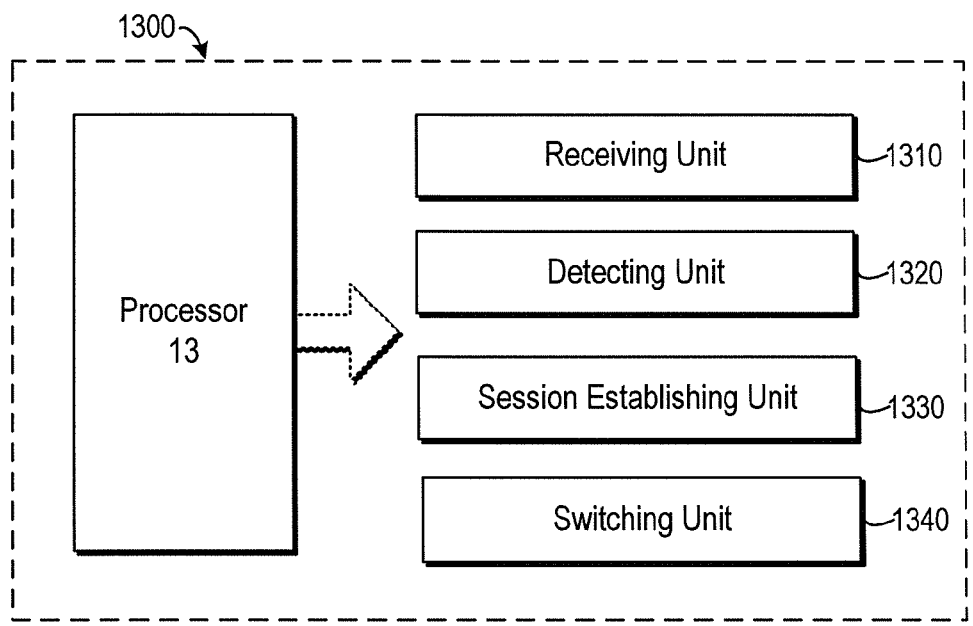
FIG. 13 is a schematic block diagram depicting a 3GPP network node operably for facilitating emergency call handover from an untrusted non-3GPP based access network to an 3GPP based access network according to an embodiment of the present disclosure.

FIG. 13 is a schematic block diagram depicting a 3GPP network node 1300 operably for facilitating emergency call handover from an untrusted non-3GPP based access network to the 3GPP based access network according to an embodiment of the present disclosure.

As shown in FIG. 13, the network node 1300 of a 3GPP based access network is configured to facilitate emergency call handover from an untrusted non-3GPP based access network to the 3GPP based access network. The network node 1300 comprises a receiving unit 1310, a detecting unit 1320, a session establishing unit 1330, a switching unit 1340. The network node 1300 may comprise multiple suitable network communications interfaces for communications with corresponding network elements, as described with reference to FIG. 1.

The network node 1300 comprises a processor 13, which may include one or more microprocessor or microcontrollers, as well as other digital hardware, which may include digital signal processors (DSPs), special-purpose digital logic, and the like. The processor 13 may be configured to execute program code stored in memory (not shown in FIG. 13), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 13 may be used to cause the receiving unit 1310, the detecting unit 1320, the session establishing unit 1330 and the switching unit 1340 to perform corresponding functions according one or more embodiments of the present disclosure.

The receiving unit 1310 is configured to receive a request message sent from a terminal device that is currently performing an emergency call over the untrusted non-3GPP based access network. The request message includes a handover indication and an emergency access point name which identifies an external network used to establish the emergency call. According to one or more embodiments of the present disclosure, the request message may be a packet data network connectivity request message or an attach request message. The detecting unit 1320 is configured to detect an event of the emergency call handover based on the handover indication and the emergency access point name. The session establishing unit 1330 is configured to establish an emergency call session with a second gateway node interfacing with the external network that is identified by the selected emergency access point name. The switching unit 1340 is configured to switch the emergency call of the terminal device from bearer of the untrusted non-3GPP based access network to the bearer of the 3GPP based access network.

According to one or more embodiments of the present disclosure, the session establishing unit 1330 may be further configured to send to the second gateway node a create session request including the emergency access point name, thereby enabling the second gateway node to identify the emergency call session.

Figure 14:
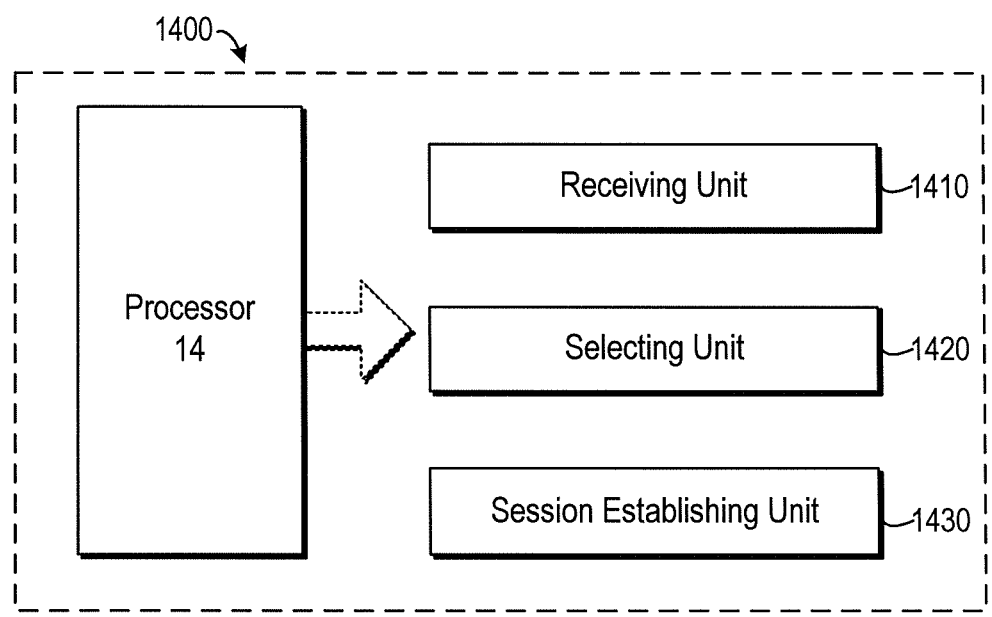
FIG. 14 is a schematic block diagram depicting a 3GPP network node operably for processing an emergency call according to an embodiment of the present disclosure.

FIG. 14 is a schematic block diagram depicting a 3GPP network node 1400 operably for processing an emergency call according to an embodiment of the present disclosure.

As shown in FIG. 14, the network node 1400 is configured to process an emergency call over a 3GPP based access network. The network node 1400 comprises a receiving unit 1410, a selecting unit 1420, a session establishing unit 1430. The network node 1400 may comprise multiple suitable network communications interfaces for communications with corresponding network elements, as described with reference to FIG. 1.

The network node 1400 comprises a processor 14, which may include one or more microprocessor or microcontrollers, as well as other digital hardware, which may include digital signal processors (DSPs), special-purpose digital logic, and the like. The processor 14 may be configured to execute program code stored in memory (not shown in FIG. 14), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 14 may be used to cause the receiving unit 1410, the selecting unit 1420, the session establishing unit 1430 to perform corresponding functions according one or more embodiments of the present disclosure.

The receiving unit 1410 is configured to receive an emergency call request initiated from a terminal device over a 3GPP based access network. The selecting unit 1420 is configured to select for the terminal device an emergency access point name that identifies an external network providing an emergency call service; the session establishing unit 1430 is configured to establish an emergency call session with a second gateway node interfacing with the external network that is identified by the emergency access point name selected by the selecting unit 1420.

According to one or more embodiments of the present disclosure, the network node 1400 may further comprise a transmitting unit configured to inform the terminal device of the selected emergency access point name.

Figure 15:
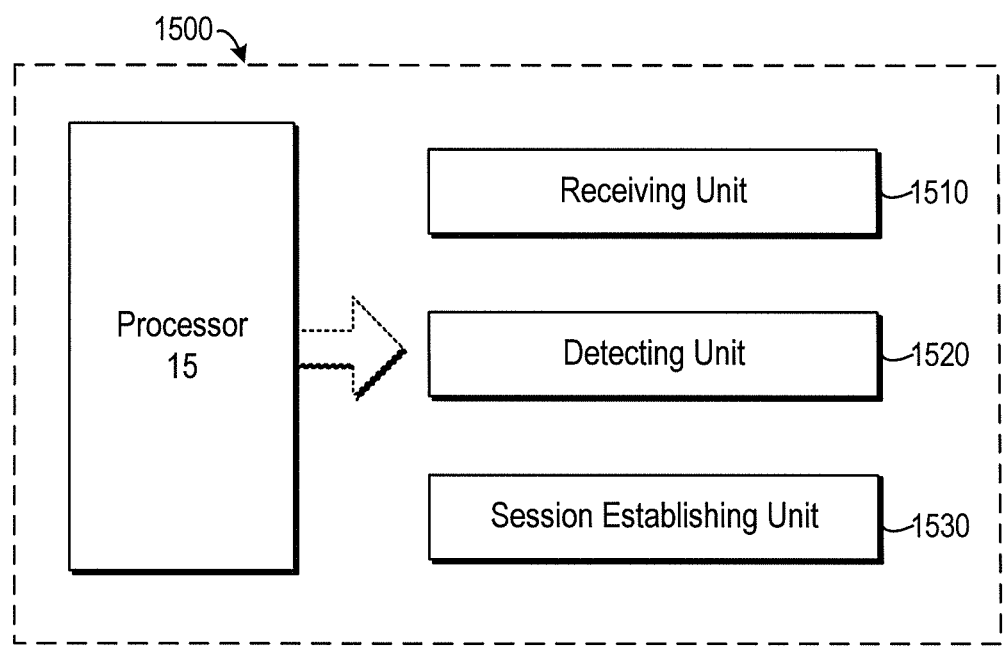
FIG. 15 is a schematic block diagram depicting a first gateway node operably for facilitating emergency call handover from a 3GPP based access network to an untrusted non-3GPP based access network according to an embodiment of the present disclosure.

FIG. 15 is a schematic block diagram depicting a first gateway node 1500 operably for facilitating emergency call handover from a 3GPP based access network to an untrusted non-3GPP based access network according to an embodiment of the present disclosure.

As shown in FIG. 15, the first gateway node 1500 is configured to facilitate emergency call handover from a 3GPP based access network to an untrusted non-3GPP based access network. The first gateway 1500 comprises a receiving unit 1510, a detecting unit 1520 and a session establishing unit 1530. The first gateway node 1500 may comprise multiple suitable network communications interfaces for communications with corresponding network elements, as described with reference to FIG. 1.

The first gateway node 1500 comprises a processor 15, which may include one or more microprocessor or microcontrollers, as well as other digital hardware, which may include digital signal processors (DSPs), special-purpose digital logic, and the like. The processor 15 may be configured to execute program code stored in memory (not shown in FIG. 15), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 15 may be used to cause the receiving unit 1510, the detecting unit 1520, and the session establishing unit 1540 to perform corresponding functions according one or more embodiments of the present disclosure.

The receiving unit 1510 is configured to receive a request message sent from a terminal device that is currently performing an emergency call over the 3GPP based access network. The request message includes a handover indication and an emergency access point name which identifies an external network used to establish the emergency call. According to one or more embodiments of the present disclosure, the request message received by the receiving unit may further include an emergency network access identifier constructed by the terminal device. The detecting unit 1520 is configured to detect an event of the emergency call handover based on the handover indication and the emergency network access identifier. The session establishing unit 1530 is configured to establish an emergency call session with a second gateway node interfacing with the external network that is identified by the emergency access point name included in the request message.

According to one or more embodiments of the present disclosure, the session establishing unit 1530 may be configured to send to the second gateway node a create session request including the handover indication and the emergency access point name, thereby enabling the second gateway node to identify the emergency call session and perform the emergency call handover. The session establishing unit 1530 may be further configured to authenticate the terminal device based on an equipment identity of the terminal device.

According to one or more embodiments of the present disclosure, a user is allowed to make an emergency call even over an untrusted non-3GPP based access network, for example, a WiFi residential environment. In a meanwhile, the continuity of the emergency call session can be maintained by appropriately handing over between the untrusted non-3GPP based access network and a 3GPP based access network.

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

As such, it should be appreciated that at least some aspects of the exemplary embodiments of the disclosure may be practiced in various components such as integrated circuit chips and modules. As well known in the art, the design of integrated circuits is by and large a highly automated process.

The present disclosure may also be embodied in the computer program product which comprises all features capable of implementing the method as depicted herein and may implement the method when loaded to the computer system.

The present disclosure has been specifically illustrated and explained with reference to the preferred embodiments. The skilled in the art should understand various changes thereto in form and details may be made without departing from the spirit and scope of the present disclosure.

What is claimed is:

1. A method implemented by a first gateway node for processing an emergency call, comprising:
receiving an emergency call request initiated from a terminal device over an untrusted non-3GPP based access network, wherein the emergency call request includes an emergency network access identifier constructed by the terminal device;

detecting an event of the emergency call depending upon the emergency network access identifier;

selecting for the terminal device an emergency access point name that identifies an external network providing an emergency call service;

establishing for the terminal device an emergency call session with a second gateway node interfacing with the external network which is identified by the selected emergency access point name; and transmitting to the terminal device a plurality of parameters of the selected emergency access point.

2. The method according to claim 1, further comprising informing the terminal device of the selected emergency access point name, thereby facilitating potential handover from the untrusted non-3GPP based access network to a 3GPP based access network.

3. The method according to claim 1, wherein establishing an emergency call session for the terminal device comprises:

sending to the second gateway node a create session request including the selected emergency access point name, thereby enabling the second network node to identify the emergency call session.

4. The method according to claim 1, wherein establishing an emergency call session for the terminal device comprises:

authenticating the terminal device based on an equipment identity of the terminal device.

5. A method implemented by a terminal device for initiating an emergency call over an untrusted non-3GPP based access network, comprising:

constructing an emergency network access identifier;

sending to a first gateway node an emergency call request including the constructed emergency network access identifier;

establishing, via the first gateway node, an emergency call session with a second gateway node interfacing with an external network providing an emergency call service; and receiving from the first gateway node a plurality of parameters of a selected emergency access point.

6. The method according to claim 5, wherein the emergency network access identifier includes a predetermined indicator of the emergency call.

7. The method according to claim 5, further comprising: receiving from the first gateway node an emergency access point name, thereby facilitating potential handover from the untrusted non-3GPP based access network to a 3GPP based access network.

8. A method implemented by a network node of a 3GPP based access network for processing an emergency call, comprising:

receiving an emergency call request initiated from a terminal device over a 3GPP based access network;

selecting for the terminal device an emergency access point name that identifies an external network providing an emergency call service;

establishing an emergency call session with a second gateway node interfacing with the external network that is identified by the selected emergency access point name; and transmitting to the terminal device a plurality of parameters of the selected emergency access point.

9. The method according to claim 8, further comprising: informing the terminal device of the selected emergency access point name, thereby facilitating potential handover from the 3GPP based access network to an untrusted non-3GPP based access network.

10. A first gateway node operably for processing an emergency call, comprising:

a receiving unit configured to receive an emergency call request initiated from a terminal device over an untrusted non-3GPP based access network, wherein the emergency call request includes an emergency network access identifier constructed by the terminal device;

a detecting unit configured to detect an event of the emergency call depending upon the emergency network access identifier;

a selecting unit configured to select for the terminal device an emergency access point name that identifies an external network providing an emergency call service; and a session establishing unit configured to establish for the terminal device an emergency call session with a second gateway node interfacing with the external network which is identified by the selected emergency access point name and to transmit to the terminal device a plurality of parameters of the selected emergency access point.

11. The first gateway node according to claim 10, further comprising:

a transmitting unit configured to inform the terminal device of the selected emergency access point name, thereby facilitating potential handover from the untrusted non-3GPP based access network to a 3GPP based access network.

12. The first gateway node according to claim 10, wherein the session establishing unit is further configured to send to the second gateway node a create session request including the selected emergency access point name, thereby enabling the second network node to identify the emergency call session.

13. The first gateway node according to claim 10, wherein the session establishing unit is further configured to authenticate the terminal device based on an equipment identity of the terminal device.

14. A terminal device operably for initiating an emergency call over an untrusted non-3GPP based access network, comprising:

an identifier constructing unit configured to construct an emergency network access identifier;

a transmitting unit configured to send to a first gateway node an emergency call request including the constructed emergency network access identifier; and a session establishing unit configured to establish, via the first gateway node, an emergency call session with a second gateway node interfacing with an external network providing an emergency call service and to receive, from the first gateway node, a plurality of parameters of a selected emergency access point.

15. The terminal device according to claim 14, wherein the emergency network access identifier includes a predetermined indicator of the emergency call.

16. The terminal device according to claim 14, further comprising:

a receiving unit configured to receive from the first gateway node an emergency access point name, thereby facilitating potential handover from the untrusted non-3GPP based access network to a 3GPP based access network.

17. A network node of a 3GPP based access network operably for processing an emergency call, comprising:

a receiving unit configured to receive an emergency call request initiated from a terminal device over a 3GPP based access network;

a selecting unit configured to select for the terminal device an emergency access point name that identifies an external network providing an emergency call service; and a session establishing unit configured to establish an emergency call session with a second gateway node interfacing with the external network that is identified by the selected emergency access point name and to transmit to the terminal device a plurality of parameters of the selected emergency access point.

18. The network node according to claim 17, further comprising:

a transmitting unit configured to inform the terminal device of the selected emergency access point name, thereby facilitating potential handover from the 3GPP based access network to an untrusted non-3GPP based access network.

19. A first gateway node operably for processing an emergency call, comprising a processor adapted to:

cause to receive an emergency call request initiated from a terminal device over an untrusted non-3GPP based access network, wherein the emergency call request includes an emergency network access identifier constructed by the terminal device;

cause to detect an event of the emergency call depending upon the emergency network access identifier;

cause to select for the terminal device an emergency access point name that identifies an external network providing an emergency call service;

cause to establish for the terminal device an emergency call session with a second gateway node interfacing with the external network which is identified by the selected emergency access point name; and cause to transmit to the terminal device a plurality of parameters of the selected emergency access point.

20. The first gateway node according to claim 19, further comprising a memory, wherein the memory includes instructions executable by the processor.

21. A terminal device operably for initiating an emergency call over an untrusted non-3GPP based access network, comprising a processor adapted to:

cause to construct an emergency network access identifier;

cause to send to a first gateway node an emergency call request including the constructed emergency network access identifier;

cause to establish, via the first gateway node, an emergency call session with a second gateway node interfacing with an external network providing an emergency call service; and cause to receive, from the first gateway node, a plurality of parameters of a selected emergency access point.

22. The terminal device node according to claim 21, further comprising a memory, wherein the memory includes instructions executable by the processor.

23. A network node of a 3GPP based access network operably for processing an emergency call, comprising a processor adapted to:

cause to receive an emergency call request initiated from a terminal device over a 3GPP based access network;

cause to select for the terminal device an emergency access point name that identifies an external network providing an emergency call service;

cause to establish an emergency call session with a second gateway node interfacing with the external network that is identified by the selected emergency access point name; and cause to transmit to the terminal device a plurality of parameters of the selected emergency access point.

24. The network node according to claim 23, further comprising a memory, wherein the memory includes instructions executable by the processor.

* * * * *